US012136372B2

(12) United States Patent
Seo et al.

(10) Patent No.: US 12,136,372 B2
(45) Date of Patent: *Nov. 5, 2024

(54) TIMING CONTROLLER FOR LOW POWER DRIVING A DISPLAY DEVICE USING CHARGE SHARING BASED ON PIXEL ARRANGEMENT

(71) Applicant: Silicon Works Co., Ltd., Daejeon (KR)

(72) Inventors: Nam Seok Seo, Daejeon (KR); Sea Ho Kim, Daejeon (KR); Hae Ju Kim, Daejeon (KR); Je Jin Myoung, Daejeon (KR); Won Sik Chae, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,448

(22) Filed: Dec. 16, 2022

(65) Prior Publication Data

US 2023/0120995 A1 Apr. 20, 2023

Related U.S. Application Data

(63) Continuation-in-part of application No. 17/122,320, filed on Dec. 15, 2020, now Pat. No. 11,694,588.

(30) Foreign Application Priority Data

Dec. 26, 2019 (KR) ........................ 10-2019-0174759
Dec. 9, 2020 (KR) ........................ 10-2020-0171019

(51) Int. Cl.
*G09G 3/20* (2006.01)

(52) U.S. Cl.
CPC ......... *G09G 3/20* (2013.01); *G09G 2310/027* (2013.01); *G09G 2310/0291* (2013.01);
(Continued)

(58) Field of Classification Search
None
See application file for complete search history.

(56) References Cited

U.S. PATENT DOCUMENTS 10,692,418 B2 6/2020 Seo et al.
2002/0051165 A1 5/2002 Morita et al.
(Continued)

FOREIGN PATENT DOCUMENTS

KR 2010-0056318 B1 5/2010
KR 2011-0050056 B1 5/2011
(Continued)

OTHER PUBLICATIONS

Taiwanese Office Action dated Apr. 29, 2024 issued in Patent Application No. 11320421680 (4 pages).

*Primary Examiner* — Amr A Awad
*Assistant Examiner* — Donna V Bocar
(74) *Attorney, Agent, or Firm* — POLSINELLI PC

(57) ABSTRACT

Disclosed are a display driver for a low power driving and a timing controller for the display device. The display device may include the timing controller configured to transmit a packet to which one of first option information corresponding to a static pattern or second option information corresponding to a dynamic pattern is applied, and a source driver configured to receive the packet and to perform a low power mode corresponding to the static pattern based on the first option information or adaptive charge sharing corresponding to the dynamic pattern based on the second option information.

17 Claims, 10 Drawing Sheets

(52) U.S. Cl.
CPC ... *G09G 2310/08* (2013.01); *G09G 2320/103* (2013.01); *G09G 2330/021* (2013.01); *G09G 2370/10* (2013.01)

(56) References Cited

U.S. PATENT DOCUMENTS

| | | | | |
|---|---|---|---|---|
| 2008/0170024 | A1 | 7/2008 | Song et al. | |
| 2009/0115772 | A1 | 5/2009 | Shiomi et al. | |
| 2011/0090190 | A1 | 4/2011 | Lin | |
| 2013/0257917 | A1* | 10/2013 | Peng | G09G 3/3688 345/690 |
| 2014/0085276 | A1 | 3/2014 | Jang et al. | |
| 2014/0198021 | A1 | 7/2014 | Tu et al. | |
| 2014/0320464 | A1* | 10/2014 | Ryu | G09G 3/3688 345/204 |
| 2016/0071454 | A1* | 3/2016 | Sohn | G09G 3/3614 345/212 |

FOREIGN PATENT DOCUMENTS

| | | | |
|---|---|---|---|
| KR | 2013-0077253 | B1 | 7/2013 |
| KR | 2014-0035197 | B1 | 3/2014 |
| KR | 2019-0058995 | A | 5/2019 |
| TW | 201428727 | A | 7/2014 |

* cited by examiner

TIMING CONTROLLER FOR LOW POWER DRIVING A DISPLAY DEVICE USING CHARGE SHARING BASED ON PIXEL ARRANGEMENT

BACKGROUND

1. Technical Field

The present disclosure relates to a low power driving technology, and more particularly, to a display device capable of low power driving and timing controller for the display device.

2. Related Art

A display device includes a timing controller, a source driver, and a display panel.

The timing controller may configure a packet comprising display data for display, control data and a clock and may be designed to provide the packet to the source driver. The source driver provides the display panel with a source signal corresponding to the display data, using the control data and the clock. The display panel displays a screen corresponding to the source signal.

The display device is required to adopt a technology for reducing power consumption in various elements. To this end, the adoption of a technology for reducing power consumption of the timing controller and the source driver is actively examined.

Furthermore, the source driver of the display device may have a structure for a unique charge sharing connection or an all-charge sharing connection for the output of a source signal.

And, the display panel includes pixels for a plurality of colors, an arrangement pattern of the pixels may be vary depending on the display panel.

Accordingly, the display device needs to be designed to provide the source driver with an option for reducing power consumption according to the arrangement pattern of the pixels or a charge sharing connection structure of the source driver.

SUMMARY

Various embodiments are directed to providing a display device for a low power driving and a timing controller for the display device, which can support a source driver that uses a charge sharing method including an all-charge sharing connection Furthermore, various embodiments are directed to providing a display device for a low power driving and a timing controller for the display device, which can provide an option for reducing power consumption and perform a power consumption operation according to the option.

Various embodiments are directed to providing a display device for a low power driving and a timing controller for the display device, which can reduce consumption power of a source driver by recognizing, by a timing controller, an arrangement pattern of the pixels of a display panel and transmitting, to the source driver, option information reflecting the arrangement pattern of the pixels.

Furthermore, various embodiments are directed to providing a display device for a low power driving, which can reduce consumption power by performing charge sharing control over an output based on the option information or performing current control over at least one of an output buffer, a gamma buffer, and an intermediate driving voltage (HVDD) buffer.

In an embodiment, a display device for a low power driving may include a timing controller configured to divide a display pattern into a static pattern and a dynamic pattern based on a difference between previous line data and current line data, and transmit a packet to which one of first option information corresponding to the static pattern and second option information corresponding to the dynamic pattern is applied, and a source driver configured to receive the packet and perform a low power mode corresponding to the static pattern based on the first option information or adaptive charge sharing corresponding to the dynamic pattern based on the second option information, wherein the timing controller receives polarity information corresponding to an arrangement of pixels of a display panel and correct polarities of the previous line data and the current line data using the polarity information.

In an embodiment, a timing controller for a display device may include a pixel value storage configured to store previous line data and current line data and provide the previous line data and the current line data for mapping, a polarity information receiver configured to receive panel information corresponding to an arrangement of pixels of a display panel and receive polarity information corresponding to the panel information, a polarity mapper configured to map the polarity information provided by the polarity information receiver to correspond to line data, a pixel value correction unit configured to correct polarities of the previous line data and the current line data based on the polarity information, an operation unit configured to receive the previous line data and the current line data from the pixel value correction unit and to calculate a power gain quantity and power loss quantity attributable to charge sharing for the current line data based on a result of a comparison between the previous line data and the current line data or calculate a first maximum change in an output of the source driver in which charge sharing is applied to the current line data and a second maximum change in the output of the source driver in which charge sharing is not applied to the current line data, and an option information providing unit configured to provide second option information on whether to apply the charge sharing to the current line data based on a result of a comparison between the power gain quantity and the power loss quantity, if a display pattern is a dynamic pattern and to provide, as first option information, one change selected from the first maximum change and the second maximum change depending on whether to apply the charge sharing to the previous line data, if the display pattern is a static pattern.

DETAILED DESCRIPTION

Figure 1:
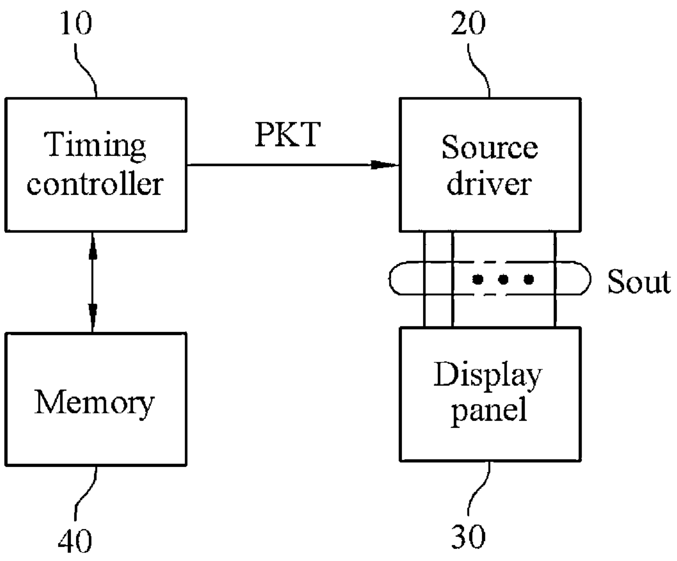
FIG. 1 is a block diagram illustrating a display device for a low power driving according to an embodiment of the present disclosure.

Exemplary embodiments will be described below in more detail with reference to the accompanying drawings. The disclosure may, however, be embodied in different forms and should not be constructed as limited to the embodiments set forth herein. Rather, these embodiments are provided so that this disclosure will be thorough and complete, and will fully convey the scope of the disclosure to those skilled in the art. Throughout the disclosure, like reference numerals refer to like parts throughout the various figures and embodiments of the disclosure.

A display device for a low power driving according to an embodiment of the present disclosure may be illustrated as in FIG. 1.

Referring to FIG. 1, a timing controller 10, a source driver 20, a display panel 30, and a memory 40 are illustrated.

The timing controller 10 may receive display data, a panel information, and polarity information, wherein the display data is received from the outside.

The display data may be understood to have a pixel value corresponding to luminance.

The panel information may be received along with the display data. The panel information may have a value representing a pattern in which pixels are arranged on the display panel 30. For example, the pixels may be arranged in one of a normal pattern and a Z-inversion pattern in the display panel 30. In this case, the panel information may have the value representing the normal pattern or the Z-inversion pattern. For example, the value of the panel information may be set to binary. The normal pattern and the Z-inversion pattern will be described later with reference to FIG. 6 and FIG. 7.

The polarity information may be stored in the memory 40. The timing controller 10 may receive the polarity information, corresponding to the panel information, from a lookup table stored in the memory 40.

In this case, the memory 40 may be configured to store the polarity information corresponding a plurality of the panel information using an EEPROM, for example, and provide the polarity information corresponded the panel information. The polarity information may be understood as a value defining a polarity for each pixel of line data corresponding to a horizontal line of a screen.

The timing controller 10 is configured to configure externally received display data in the form of a packet PKT and provide the packet PKT to the source driver 20.

In this case, the timing controller 10 may configure the packet PKT including display data and control data. The control data may include various types of option information for distinguishing between power control modes.

The timing controller 10 may correct the polarity of a pixel value of line data using the polarity information, and may generate the option information based on a result of a comparison between previous line data and current line data whose polarities have been corrected.

The power control modes may be classified into a low power mode control operation and an adaptive charge sharing control operation. The option information may represent low power mode control or adaptive charge sharing control, may have a value according to a predetermined protocol, and may be applied to the packet PKT by being included in the control data.

The source driver 20 receives a packet PKT from the timing controller 10 and outputs, to the display panel 30, a source signal (Sout) corresponding to display data. In this case, the source driver 20 may be configured to perform a power control mode corresponding to option information of control data in a process of converting the display data into the source signal (Sout) and a process of outputting the source signal (Sout).

The source driver 20 may include a latch, a shift register, a digital-to-analog converter, and an output buffer for the conversion of the display data. Furthermore, the source driver 20 may include a gamma buffer for providing a gamma voltage to the digital-to-analog converter and an intermediate driving voltage (HVDD) buffer for providing a driving voltage to the output buffer.

Since the latch, the shift register, the digital-to-analog converter, the output buffer, the gamma buffer, and the intermediate driving voltage buffer are components commonly used in the source driver 20, detailed illustrations and descriptions thereof are omitted.

The display panel 30 may be configured as a flat display panel. Illustratively, a display panel including pixels using an organic light-emitting diode (OLED), a light-emitting diode (LED) or a liquid crystal display (LCD) may be used as the display panel 30.

In the configuration of FIG. 1, the display device according to an embodiment of the present disclosure are configured to include the timing controller 10 and the source driver 20.

Figure 2:
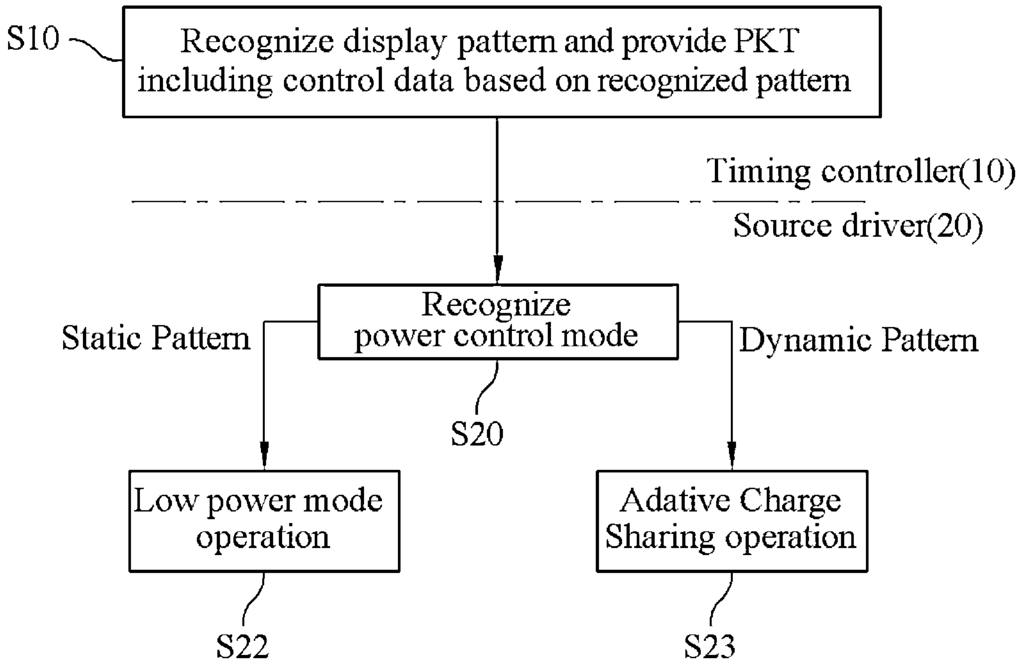
FIG. 2 is a flowchart illustrating a lower power driving method according to the embodiment of FIG. 1.

A method of the low power driving of a display device is described with reference to FIG. 2.

First, the timing controller 10 is configured to divide a display pattern into a static pattern and a dynamic pattern based on a difference between previous line data and current line data and to transmit a packet PKT to which one of first option information corresponding to the static pattern and second option information corresponding to the dynamic pattern is applied.

The timing controller 10 performs a control process. The control process may include step S10 of recognizing a display pattern and providing a packet PKT, including control data having the first option information or the second option information, based on the recognized display pattern.

The source driver 20 may receive a packet PKT, and may recognize a power control mode based on the first option information or the second option information. More specifically, the source driver 20 is configured to perform a low power mode control operation, corresponding to a static pattern, based on the first option information or an adaptive charge sharing control operation, corresponding to a dynamic pattern, based on the second option information.

That is, the source driver 20 performs a driving process based on the recognized power control mode. The driving process includes step S20 of recognizing the power control mode based on a display pattern, step S22 of performing the low power mode if the display pattern is a static pattern, and step S23 of performing adaptive charge sharing if the display pattern is a dynamic pattern.

The display pattern may be determined as one of the static pattern and the dynamic pattern by comparing previous line data and current line data.

Furthermore, a determination criterion for distinguishing between the static pattern and the dynamic pattern may be set as a data change between the previous line data and the current line data. A criterion for the data change for distinguishing between the static pattern and the dynamic pattern may be variously set depending on a manufacturer's intention.

Among the static pattern and the dynamic pattern, the static pattern may be defined as a case where source signals (Sout), that is, the output of the source driver 20, are constantly maintained because a data change between previous line data and current line data is small.

Furthermore, the dynamic pattern may be defined as a case where source signals (Sout), that is, the output of the source driver 20, swing because a data change between previous line data and current line data is great.

In an embodiment of the present disclosure, if a display pattern is a static pattern, the timing controller 10 is configured to provide the first option information for determining a power control mode as the low power mode control operation. The source driver 20 is configured to perform the low power mode for reducing consumption power by reducing the amount of current that maintains an output for current line data based on the first option information.

Furthermore, in an embodiment of the present disclosure, if a display pattern is a dynamic pattern, the timing controller 10 is configured to provide the second option information for determining a power control mode as the adaptive charge sharing control operation. The source driver 20 is configured to perform the adaptive charge sharing for reducing consumption power in a way to provide a current, discharged from a load capacitor of the display panel 30, to the place that needs to be charged, by performing charge sharing on the output of current line data based on the second option information.

The timing controller 10 provides a packet PKT, including the first option information or the second option information in control data, in order to reduce consumption power of the source driver 20. To this end, the timing controller 10 may be configured as in FIG. 3.

Figure 4:
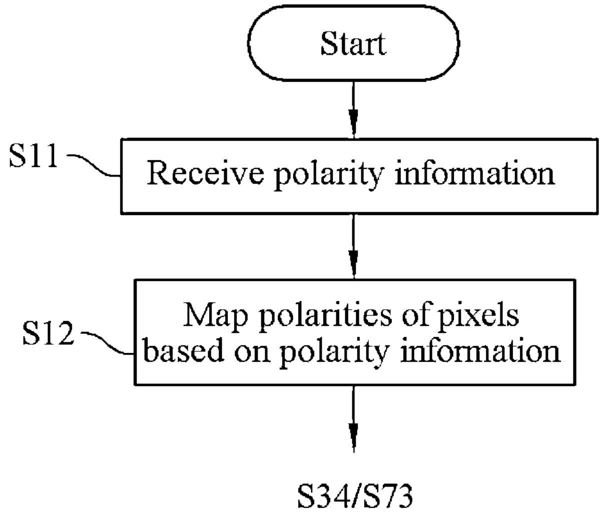
FIG. 4 is a flowchart illustrating an operation of a packet mapper illustrated in FIG. 3.
Figure 5:
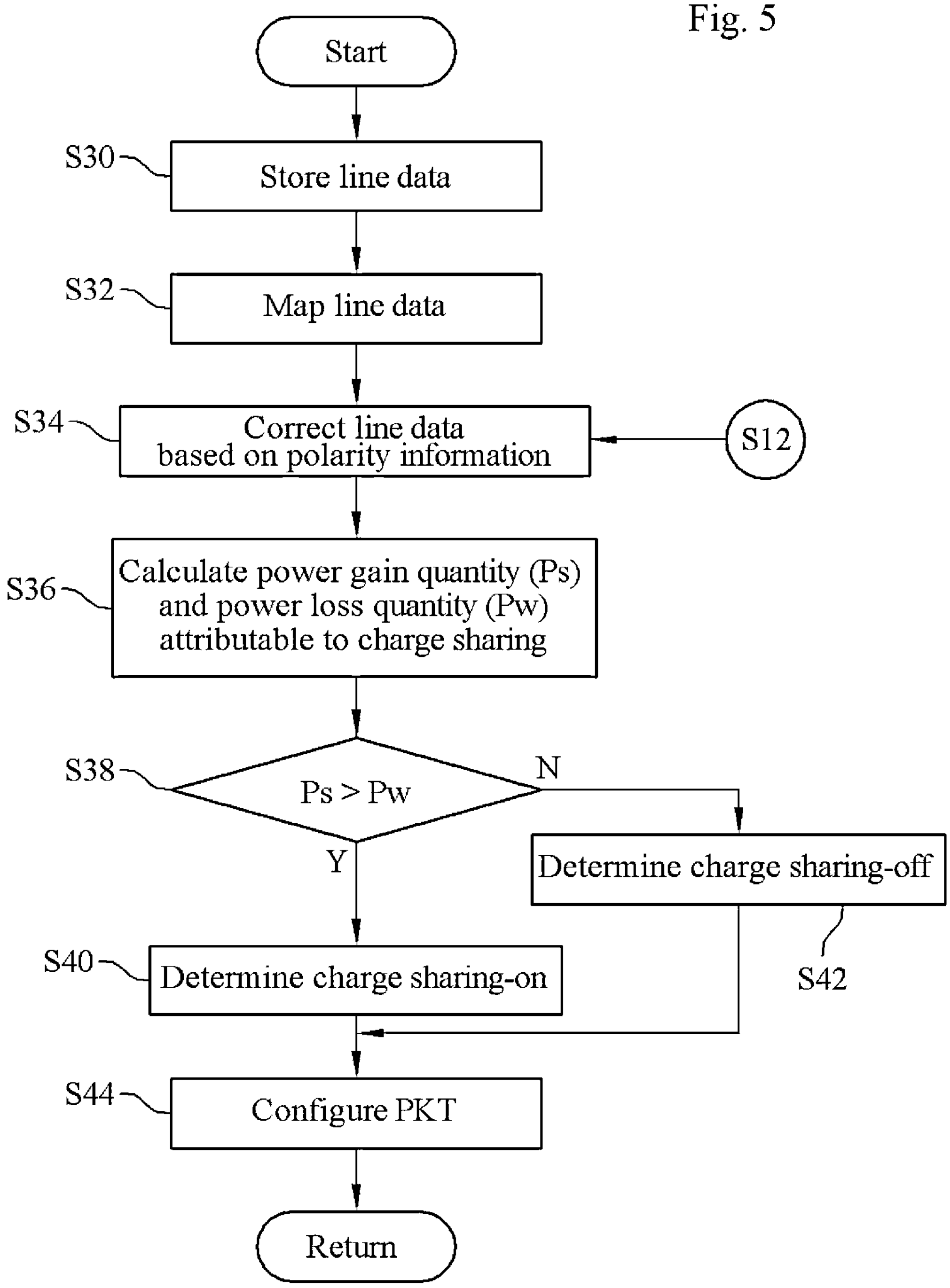
FIG. 5 is a flowchart illustrating an adaptive charge sharing control operation.

The second option information may be determined and provided by an adaptive charge sharing control operation of FIGS. 4 and 5. The first option information may be determined and provided by a low power mode control operation of FIGS. 4 and 9. The adaptive charge sharing control operation and the low power mode control operation may be understood to be included in step S10 of FIG. 2 of recognizing a display pattern and providing a packet PKT, including control data having the first option information or the second option information, based on the recognized display pattern.

Figure 3:
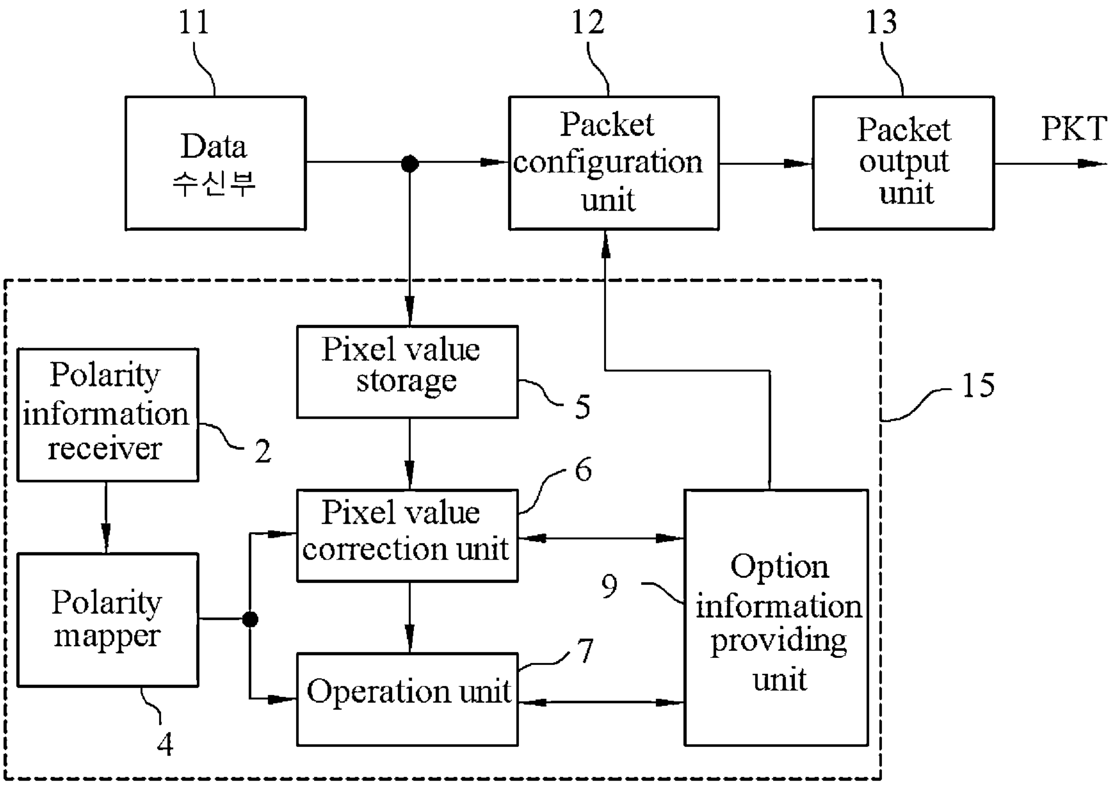
FIG. 3 is a block diagram of a timing controller illustrated in FIG. 1.

First, referring to FIG. 3, the timing controller 10 includes a data receiver 11, a packet configuration unit 12, a packet output unit 13, and an option information configuration unit 15.

The data receiver 11 transmits externally received display data to the packet configuration unit 12. The packet configuration unit 12 provides the packet output unit 13 with parallel data including the display data, control data, and a clock for configuring a packet PKT. The packet output unit 13 converts the parallel data into serial data according to a predetermined protocol, and transmits the serial data to the source driver 20 as the packet PKT.

In the above configuration, the packet configuration unit 12 receives the first option information or the second option information provided by the option information configuration unit 15, and operates so that the first option information or the second option information is included in the control data.

The option information configuration unit 15 is configured to correct the polarity of line data based on the panel information and to provide the first option information or the second option information based on a result of a comparison between previous line data and current line data. To this end, the option information configuration unit 15 includes a polarity information receiver 2, a polarity mapper 4, a pixel value storage 5, a pixel value correction unit 6, an operation unit 7, and an option information providing unit 9.

The polarity information receiver 2 receives panel information having a value representing a pattern in which pixels are arranged on the display panel 30, provides the panel information to the memory 40 and receives the polarity information corresponding the panel information from the outer memory 40.

The panel information may be received along with display data or may be previously set in an internal memory (not illustrated).

The polarity information receiver 2 may receive the polarity information, corresponding to the panel information, from the lookup table stored in the memory 40.

The polarity mapper 4 maps the polarity information provided by the polarity information receiver 2 to correspond to the line data. To map may be understood to mean arranging the polarities to correspond to pixels included in the line data based on the polarity information. That is, the polarity information may be determined based on the panel information. The polarity for each pixel on the line data is mapped based on the polarity information. Accordingly, the polarity information may be understood to include a polarity value for mapping for each pixel of a horizontal line, and the polarity value may be understood to distinguish between positive polarity and negative polarity.

The pixel value storage 5 may be configured as a memory for storing display data, transmitted from the data receiver 11 to the packet configuration unit 12, in a horizontal line unit. The pixel value storage 5 is configured to have a capacity capable of storing at least previous line data and current line data and providing the previous line data and the current line data for mapping. Furthermore, the pixel value storage 5 may be configured to store display data in a horizontal line unit and provide previous line data and current line data, stored therein, for mapping, in synchronization with control and an operation of the option information providing unit 9.

The pixel value correction unit 6 corrects polarities of previous line data and current line data based on the polarity information of line data for each pixel, provided by the polarity mapper 4, and provides the operation unit 7 with the previous line data and the current line data having the corrected polarities.

The operation unit 7 receives the previous line data and current line data from the pixel value correction unit 6. The operation unit 7 may perform an operation of computing a data change by mapping the previous line data and the current line data, an operation of determining a display pattern in response to the data change, an operation of calculating a power gain quantity (Ps) and a power loss quantity (Pw) attributable to charge sharing for the current line data, an operation of comparing the power gain quantity (Ps) and the power loss quantity (Pw), and an operation of detecting maximum changes (Lpeak_cs and Lpeak_ncs) in the output of the source driver, if the charge sharing is applied to the current line data and if the charge sharing is not applied to the current line data, respectively. The operation unit 7 may perform some operations, selected from the operations, based on a display pattern, and provides the results of the operations to the option information providing unit 9.

The operation unit 7 may receive, from the polarity mapper 4, information on a polarity of line data, for the operations, and may perform the operations based on a positive polarity and a negative polarity.

The option information providing unit 9 may control the operation unit 7 to select an operation to be performed in accordance with a display pattern, receives the results of the operation, determines option information corresponding to the display pattern, and provides the determined option information to the packet configuration unit 12.

Figure 9:
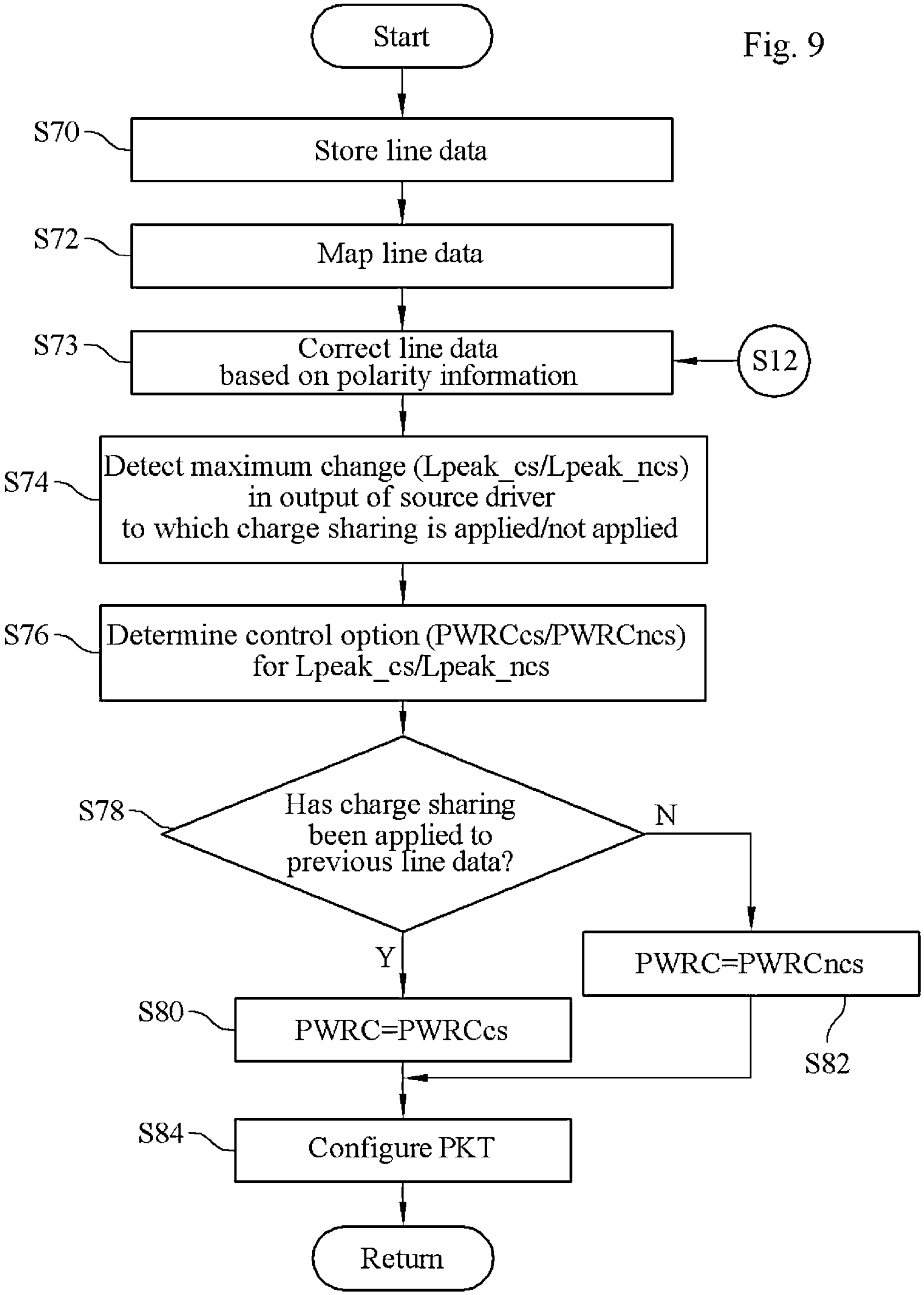
FIG. 9 is a flowchart illustrating an operation of controlling a low power mode.

That is, the option information configuration unit 15 may determine the second option information obtained by performing the adaptive charge sharing control operation of FIGS. 4 and 5 or the first option information obtained by performing the low power mode control operation of FIGS. 4 and 9, and may provide the determined first option information or second option information to the packet configuration unit 12.

The low power mode control operation of FIG. 4 is performed by the polarity mapper 4 of FIG. 3. FIG. 4 illustrates that polarity information corresponding to the panel information is received(S11) and the polarities of the pixels of the horizontal line are mapped by the polarity information(S12).

The result of polarity mapping of the polarity mapper 4 in FIG. 4 is incorporated into a line data correction step S34 based on the polarity of a channel in the adaptive charge sharing control operation of FIG. 5 and a line data correction step S73, based on the polarity of a channel in the low power mode control operation of FIG. 9, and steps S34 and S73 will be described later. The channel may be understood as an output buffer of the source driver 20 providing a source signal to a pixel. And the polarity of the channel may be understood as corresponding to the polarity of the pixel. Since the channel may be understood with reference to FIG. 8, a detailed description thereof will be omitted.

The adaptive charge sharing control operation of FIG. 5 is performed if a display pattern is a dynamic pattern.

The adaptive charge sharing control operation is described in brief. The adaptive charge sharing control operation includes correcting previous line data and current line data to have a polarity mapped for each pixel based on polarity information, calculating a power gain quantity (Ps) and power loss quantity (Pw) attributable to charge sharing for the current line data by mapping and comparing the previous line data and the current line data, and determining whether to apply the charge sharing to the current line data by comparing the power gain quantity (Ps) and the power loss quantity (Pw).

That is, the second option information according to the adaptive charge sharing control process may be understood as information indicating whether to apply charge sharing to a source signal corresponding to the current line data.

Furthermore, the low power mode control operation of FIG. 9 is performed if a display pattern is a static pattern.

The low power mode control operation is described in brief. The low power mode control operation includes correcting previous line data and current line data to have a polarity mapped for each pixel based on polarity information, mapping and comparing the previous line data and the current line data, detecting a first maximum change in the output of the source driver 20 in which charge sharing is applied to the current line data, and selecting the first maximum change as a first option level. Furthermore, the low power mode control operation includes mapping and comparing the previous line data and the current line data, detecting a second maximum change in the output of the source driver 20 in which charge sharing is not applied to the current line data, and selecting the second maximum change as a second option level.

Thereafter, one of the first option level and the second option level is selected as the first option information to be applied to a packet, depending on whether to apply charge sharing to the previous line data.

The adaptive charge sharing control operation is specifically described with reference to FIG. 5.

First, if a display pattern is a dynamic pattern, in order to determine whether to apply charge sharing, the timing controller 10 stores previous line data (N−1 line) and current line data (N line) in the pixel value storage 5 (S30), and maps the previous line data (N−1 line) and the current line data (N line) (S32).

Figure 6:
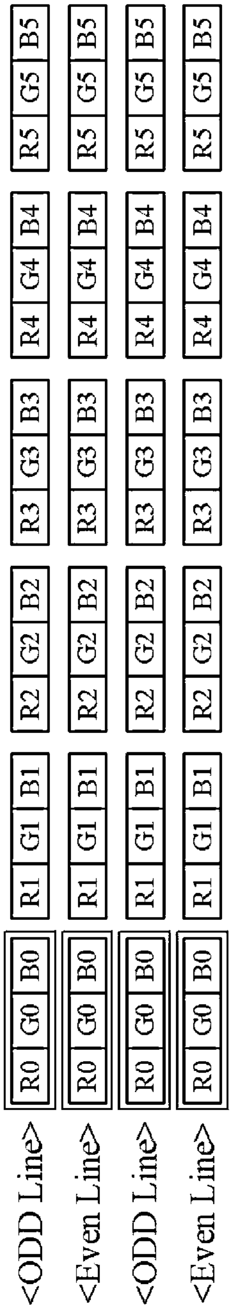
FIGS. 6 and 7 are exemplary diagrams of a panel structure.
Figure 7:
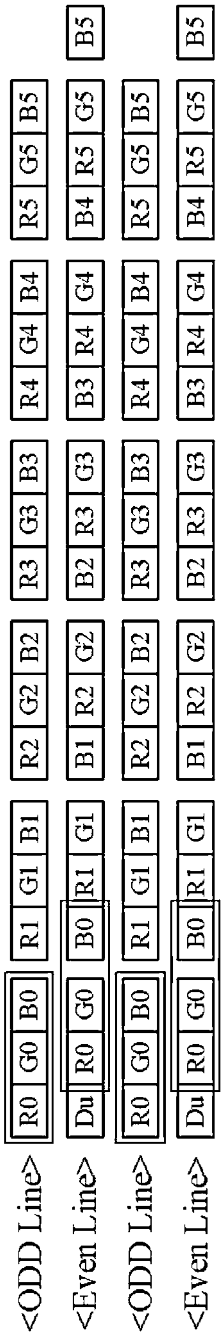

The display panel 30 may include pixels arranged in various arrangement patterns. Illustratively, FIG. 6 is a diagram illustrating the arrangement pattern of pixels of the normal type display panel 30. FIG. 7 is a diagram illustrating the arrangement pattern of pixels of the Z-inversion type display panel 30. In FIGS. 6 and 7, an Rx-series pixel means a red pixel, a Bx-series pixel means a blue pixel, a Gx-series pixel means a green pixel, and a Du pixel means a dummy pixel.

The timing controller 10 configures a packet PKT by sorting display data depending on the arrangement pattern of the display panel 30 so that the red pixels, the blue pixels, and the green pixels are differently arranged in a line unit.

Therefore, the timing controller 10 invokes panel information for confirming the specifications of the display panel 30 in order to compare the previous line data (N−1 line) and the current line data (N line), and controls the pixel value storage 5 to store the previous line data (N−1 line) and the current line data (N Line).

Thereafter, the pixel value correction unit 6 corrects the previous line data (N−1 line) and the current line data (N line) to have a polarity corresponding to the polarity information for each pixel, based on the polarity information of line data for each channel, provided by the polarity mapper 4 (S34).

Thereafter, the timing controller 10 controls the operation unit 7 to calculate a power gain quantity (Ps) and power loss quantity (Pw) attributable to charge sharing for the current line data by comparing the previous line data and the current line data (S36). The power gain quantity (Ps) and the power loss quantity (Pw) may be calculated using a calculation equation preset in the timing controller 10.

The operation unit 7 may receive, from the polarity mapper 4, polarity information of line data for each channel for the operations, and may perform the operations based on a positive polarity and a negative polarity.

Figure 8:
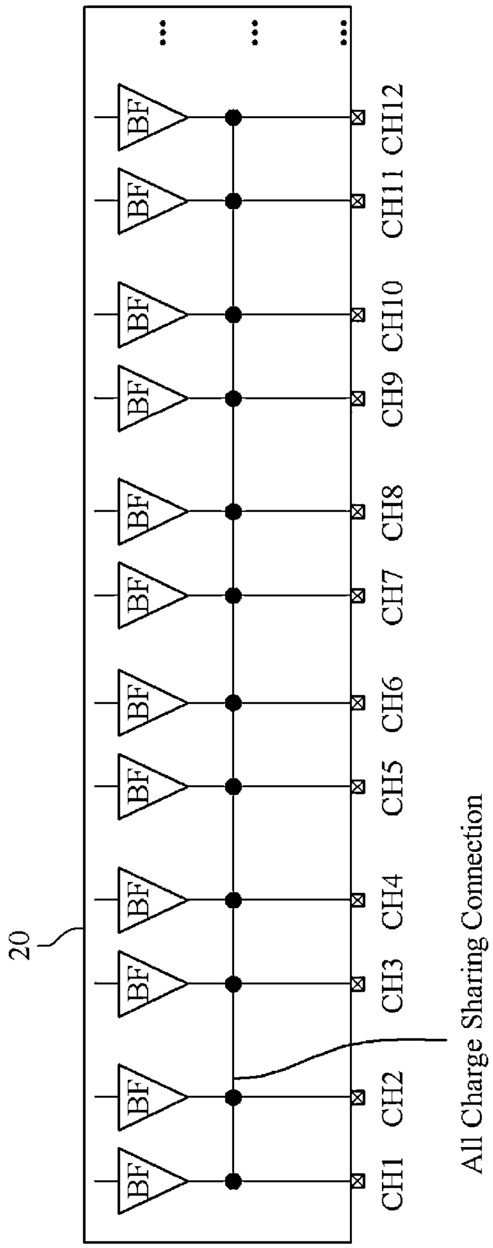
FIG. 8 is a block diagram for describing an all-charge sharing connection applied to an embodiment of the present disclosure.

As illustrated in FIG. 8, the source driver 20 according to an embodiment of the present disclosure may be configured to perform charge sharing on all channels of line data based on an all-charge sharing connection. The source driver 20 includes a plurality of channels BF for outputting a source signal (Sout). The plurality of channels BF may output channel signals CH1 to CH12, and may be understood to correspond to all pixels of line data. It may be understood that the output channel signals CH1 to CH12 correspond to the source signal Sout. All-charge sharing means that all the channels BF are connected in common to perform charge sharing.

In FIG. 8, the switching of connection of the channels BF for the charge sharing may be implemented using a plurality of MOS transistors. Since the plurality of MOS transistors may be variously configured depending on a manufacturer's intention, a detailed example thereof is omitted.

In the all-charge sharing connection structure, a charge sharing voltage may be determined to have a level to which an average of the voltages of connected channels is applied.

Each of the channels BF may be configured to output a voltage having a positive polarity in a voltage range of an intermediate driving voltage (HVDD) or more or to output a voltage having a negative polarity in a voltage range of less than the intermediate driving voltage (HVDD). Furthermore, each of the channels BF performs charge sharing while being driven in a horizontal line unit. That is, each of the channels repeats the driving and the charge sharing based on pixel data varying in a horizontal line unit.

The channel BF that outputs the voltage having the positive polarity may drive an output in the range of the intermediate driving voltage (HVDD) to a driving voltage (VDD). The channel BF that outputs the voltage having the negative polarity may drive an output in the range of a ground voltage (VSS) to the intermediate driving voltage (HVDD). In this case, the intermediate driving voltage (HVDD) may be set as a voltage having a level between (e.g., middle) the driving voltage (VDD) and the ground voltage (VSS).

A charge sharing voltage having the positive polarity and the negative polarity, applied to all the channels BF, varies in a horizontal line unit, and is determined to have a level to which an average of the voltages of all the channels BF subjected to an all-charge sharing connection is applied. Therefore, a level of a charge sharing voltage may correspond to the positive polarity having the intermediate driving voltage (HVDD) or more or the negative polarity of less than the intermediate driving voltage (HVDD).

In a process of repeating the driving and the charge sharing, power saving and power consumption may be performed depending on a change in voltages of the channels BF.

If voltages of the channels BF are charged by a current discharged when the voltages vary from a driving voltage of a previous line to a charge sharing level or vary from the charge sharing level to a driving voltage of a next line, it may be understood that power saving is performed on the channels BF. In this case, the power saving may be used to calculate a power gain quantity (Ps) attributable to the charge sharing.

Furthermore, if power consumption occurs when voltages of the channels BF vary from a driving voltage of a previous horizontal line to a charge sharing voltage or vary from the charge sharing voltage to a driving voltage of a next horizontal line, the power consumption may be used to calculate a power loss quantity (Pw) attributable to the charge sharing.

As described above, the timing controller 10 controls the operation unit 7 to calculate the power gain quantity (Ps) and power loss quantity (Pw) attributable to the charge sharing for the current line data by comparing the previous line data and current line data for all the channels BF subjected to the all-charge sharing connection (S36).

When the power gain quantity (Ps) and the power loss quantity (Pw) are calculated, the option information providing unit 9 of the timing controller 10 compares the power gain quantity (Ps) and the power loss quantity (Pw) calculated by the operation unit 7, and checks whether the power gain quantity (Ps) is greater than the power loss quantity (Pw) (S38).

Illustratively, step S38 of checking whether the power gain quantity (Ps) is greater than the power loss quantity (Pw) may be configured to determine whether the power gain quantity (Ps) is greater than the power loss quantity (Pw) by a preset offset level or more.

When the power gain quantity (Ps) is equal to or smaller than the power loss quantity (Pw), the option information providing unit 9 of the timing controller 10 determines not to apply charge sharing to the current line data, determines charge sharing-off (S42), defines corresponding second option information, and provides the defined second option information to the packet configuration unit 12. Accordingly, the packet configuration unit 12 configures a packet PKT to which the second option information, indicating that charge sharing is not to be applied to the current line data, is applied (S44).

In contrast, when the power gain quantity (Ps) is greater than the power loss quantity (Pw), the option information providing unit 9 of the timing controller 10 determines to apply charge sharing to the current line data, determines charge sharing-on (S40), defines corresponding second option information, and provides the second option information to the packet configuration unit 12. Accordingly, the packet configuration unit 12 configures a packet PKT to which the second option information, indicating that charge sharing is to be applied to the current line data, is applied (S44).

As described above, if a display pattern is a dynamic pattern, the timing controller 10 may generate the second option information, indicating whether to apply charge sharing to a source signal corresponding to current line data, through the adaptive charge sharing control process such as FIG. 5, and may provide the source driver 20 with a packet PKT to which the second option information is applied.

The source driver 20 performs adaptive charge sharing on a source signal in order to reduce power consumption based on the second option information indicating that charge sharing is to be performed, and outputs a source signal normally without performing adaptive charge sharing based on the second option information indicating that charge sharing is not to be performed.

The low power mode control operation is specifically described with reference to FIG. 9.

If a display pattern is a static pattern, the timing controller 10 may perform the low power mode control operation for reducing power consumption by controlling the amount of current for the output of the source driver 20, as in FIG. 9.

If a display pattern is a static pattern, the timing controller 10 stores previous line data (N−1 line) and current line data (N line) in the pixel value storage 5 (S70), and maps the previous line data (N−1 line) and the current line data (N line) (S72).

The timing controller 10 configures a packet PKT by sorting display data so that red pixels, blue pixels, and green pixels are differently arranged in a horizontal line unit depending on the arrangement pattern of pixels of the display panel 30.

Therefore, the timing controller 10 invokes panel information for confirming the specifications of the display panel 30 in order to compare the previous line data (N−1 line) and the current line data (N line), and controls the pixel value storage 5 to store the previous line data (N−1 line) and the current line data (N Line).

Thereafter, the pixel value correction unit 6 corrects the previous line data (N−1 line) and the current line data (N line) to have a corresponded polarity for each pixel, based on polarity information on a polarity of line data for each pixel, provided by the polarity mapper 4 (S73).

If a display pattern is a static pattern, the timing controller 10 checks a change in the output of the source driver 20 for the current line data and performs the low power mode control process of determining the first option information suitable for a maximum change.

Figure 10:
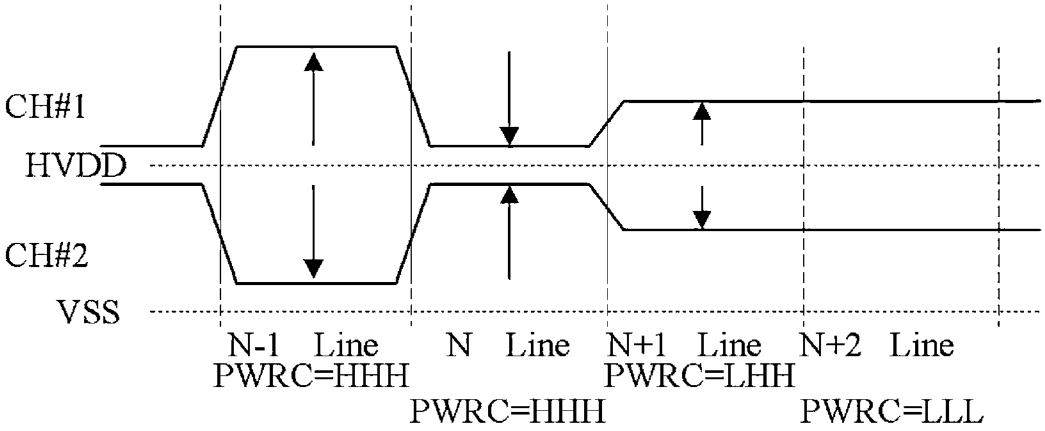
FIG. 10 is a waveform diagram for describing an operation of controlling a low power mode according to an output level of a source driver.

Referring to FIG. 10, the first option information is indicated as PWRC and may be changed like "HHH", "LHH", or "LLL."

The first option information may be determined to control the amount of current in a range in which the output of the source driver 20 can be maintained based on a line data having a static pattern.

Figure 11:
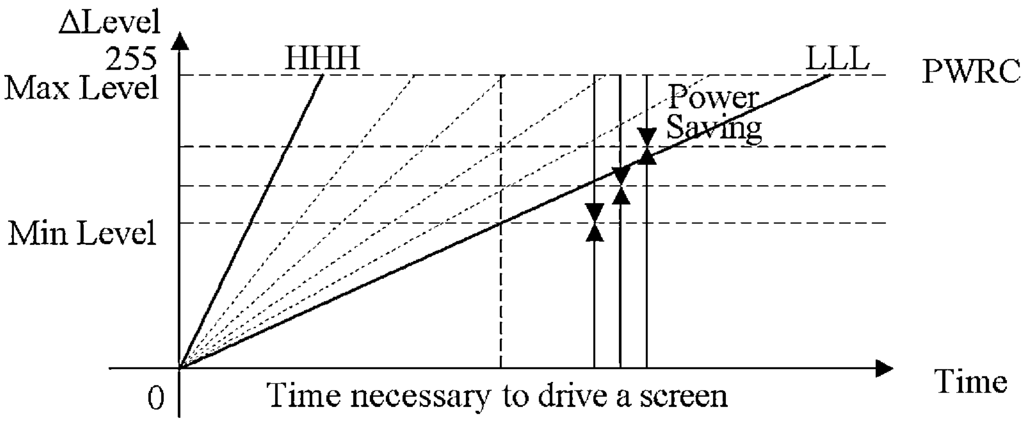
FIG. 11 is a graph illustrating an output change slope of the source driver according to time corresponding to option information.

As in FIG. 11, the first option information PWRC may be determined to be included in a range that satisfies time necessary to drive a screen and a minimum level (Min Level), and may be set in a line data unit in order to reduce the amount of current. That is, the first option information may be determined based on current line data in order to reduce the amount of current in a range in which an output voltage is maintained based on previous line data.

To this end, the timing controller 10 controls the operation unit 7 to compare the previous line data and the current line data.

The operation unit 7 of the timing controller 10 detects, as an absolute value, a first maximum change (Lpeak_cs) in the output of the source driver 20 in which charge sharing is applied to the current line data, by comparing the previous line data and the current line data, and detects, as an absolute value, a second maximum change (Lpeak_ncs) in the output of the source driver 20 to which charge sharing is not applied to the current line data, by comparing the previous line data and the current line data (S74).

The operation unit 7 of the timing controller 10 selects the first maximum change (Lpeak_cs) and the second maximum change (Lpeak_ncs), detected as described above, as a first option level and a second option level, respectively, and determines control options (PWRCcs and PWRCncs) corresponding to the first option level and the second option level, respectively (S76).

Thereafter, the option information providing unit 9 of the timing controller 10 checks whether the charge sharing has been applied to the previous line data (S78).

If the charge sharing has been applied to the previous line data, the option information providing unit 9 of the timing controller 10 selects the control options (PWRCcs) as the first option information (PWRC) (S80), and provides the first option information (PWRC) to the packet configuration unit 12. A packet PKT may be configured by applying the first option information (PWRC) thereto (S84).

In contrast, if the charge sharing has not been applied to the previous line data, the option information providing unit 9 of the timing controller 10 selects the control options (PWRCncs) as the first option information (PWRC) (S82), and provides the first option information (PWRC) to the packet configuration unit 12. A packet PKT may be configured by applying the first option information (PWRC) thereto (S84).

If a display pattern is a static pattern, the timing controller 10 performs control for reducing power consumption by controlling the amount of current for the output of the source driver 20 through the low power mode control operation.

The timing controller 10 can reduce power consumption of the source driver 20 by performing the adaptive charge sharing control operation of FIG. 4 and the low power mode control operation of FIG. 9 every line data unit.

The timing controller 10 may perform the low power mode control process by considering each of the output buffer, the gamma buffer, and the intermediate driving voltage buffer, may generate separate option information for controlling the output buffer, the gamma buffer, and the intermediate driving voltage buffer, and may apply the separate option information to a packet PKT.

Accordingly, the source driver 20 may be controlled to reduce total current consumption because the output buffer, the gamma buffer, and the intermediate driving voltage buffer are controlled based on respective option information.

Through the aforementioned configurations and operations of the embodiments, the present disclosure can support the source driver that uses various charge sharing methods, such as the all-charge sharing connection, and provide an option for freely reducing power consumption with respect to a polarity, by correcting a polarity of line data based on a packet type and packet data.

Through the aforementioned configurations and operations, the present disclosure can reduce consumption power of the source driver 20 by recognizing, by the timing controller 10, a display pattern and transmitting, to the source driver 20, option information corresponding to the recognized display pattern.

Furthermore, the present disclosure can reduce consumption power by performing charge sharing control over the output of the source driver 20 or current control over at least one of the output buffer, the gamma buffer, and the intermediate driving voltage (HVDD) buffer, based on option information corresponding to a display pattern.

The present disclosure has effects in that it can support the source driver that uses various charge sharing methods, such as the all-charge sharing connection, and provide an option for freely reducing power consumption with respect to a polarity, by correcting a polarity of line data corresponding to arrangement pattern of pixels of a display panel.

The present disclosure has an effect in that it can reduce consumption power of the source driver by recognizing, by the timing controller, an arrangement pattern of pixels and transmitting, to the source driver, option information corresponding to the recognized the arrangement pattern of the pixels.

Furthermore, the present disclosure has an effect in that it can reduce consumption power by performing charge sharing control over the output of the source driver or current control over at least one of the output buffer, the gamma buffer, and the intermediate driving voltage (HVDD) buffer, based on option information corresponding to the arrangement pattern of the pixels.

While various embodiments have been described above, it will be understood to those skilled in the art that the embodiments described are by way of example only. Accordingly, the disclosure described herein should not be limited based on the described embodiments.

What is claimed is:

1. A display device for low power driving, comprising:

a timing controller configured to:

divide a display pattern into a static pattern and a dynamic pattern based on a difference between previous line data and current line data, and transmit a packet to which one of first option information corresponding to the static pattern and second option information corresponding to the dynamic pattern is applied; and a source driver configured to receive the packet and perform a low power mode corresponding to the static pattern based on the first option information or adaptive charge sharing corresponding to the dynamic pattern based on the second option information, wherein the timing controller is configured to:

receive polarity information corresponding to a physical arrangement pattern of pixels of a display panel and corrects polarities of the previous line data and the current line data using the polarity information based on the physical arrangement pattern of pixels, determine whether to apply charge sharing to the current line data based on a result of a comparison between a power gain quantity and a power loss quantity, calculate the power gain quantity and the power loss quantity attributable to charge sharing for the current line data based on a result of a comparison between the previous line data and the current line data, and provide the second option information based on determining to apply charge sharing to the current line data.

2. The display device of claim 1, wherein the timing controller provides the second option information for charge sharing-off for the current line data when the power gain quantity is equal to or smaller than the power loss quantity, and provides the second option information for charge sharing-on for the current line data when the power gain quantity is greater than the power loss quantity.

3. The display device of claim 1, wherein the timing controller calculates the power gain quantity and the power loss quantity attributable to the charge sharing for the current line data by comparing the previous line data and the current line data with respect to all channels of the source driver subjected to an all-charge sharing connection.

4. The display device of claim 1, wherein the timing controller computes a first maximum change in an output of the source driver in which charge sharing is applied to the current line data and a second maximum change in the output of the source driver in which charge sharing is not applied to the current line data based on the result of the comparison between the previous line data and the current line data, and provides, as the first option information, one change selected depending on whether to apply the charge sharing to the previous line data, among the first maximum change and the second maximum change.

5. The display device of claim 4, wherein the timing controller provides the first maximum change as the first option information if the charge sharing is applied to the previous line data, and provides the second maximum change as the second option information if the charge sharing is not applied to the previous line data.

6. The display device of claim 4, wherein the source driver performs the low power mode in which an amount of current to maintain an output of the current line data is reduced based on one of the first maximum change and the second maximum change provided as the first option information.

7. The display device of claim 1, wherein:

the timing controller provides the first option information comprising information for distinguishing among an output buffer, a gamma buffer, and an intermediate driving voltage buffer, and the source driver performs the low power mode on one buffer selected based on the first option information, among the output buffer, the gamma buffer, and the intermediate driving voltage buffer.

8. The display device of claim 1, wherein the timing controller comprising:

a pixel value storage configured to store the previous line data and the current line data and provide the previous line data and the current line data for mapping;

a polarity information receiver configured to receive panel information corresponding to the arrangement pattern of pixels of the display panel and receive the polarity information corresponding to the panel information;

wherein the timing controller is configured to:

map the polarity information provided by the polarity information receiver to correspond to line data; and correct the polarities of the previous line data and the current line data based on the polarity information.

9. The display device of claim 8, wherein the timing controller is configured to:

receive the previous line data and the current line data from the pixel value correction device and to calculate the power gain quantity and the power loss quantity attributable to charge sharing for the current line data based on the result of the comparison between the previous line data and the current line data or calculate a first maximum change in an output of the source driver in which charge sharing is applied to the current line data and a second maximum change in the output of the source driver in which charge sharing is not applied to the current line data; and provide the second option information on whether to apply the charge sharing to the current line data based on a result of a comparison between the power gain quantity and the power loss quantity, if the display pattern is the dynamic pattern and to provide, as the first option information, one change selected from the first maximum change and the second maximum change depending on whether to apply the charge sharing to the previous line data, if the display pattern is the static pattern.

10. The display device of claim 8, wherein the timing controller further comprising:

a memory configured to store the polarity information corresponding a plurality of the panel information and provide the polarity information corresponded the panel information wherein the timing controller receives display data and the panel information from an external source, and receives the polarity information corresponding to the panel information from the memory.

11. A display device for low power driving, comprising:

a timing controller configured to:

divide a display pattern into a static pattern and a dynamic pattern based on a difference between previous line data and current line data, and transmit a packet to which one of first option information corresponding to the static pattern and second option information corresponding to the dynamic pattern is applied; and a source driver configured to receive the packet and perform a low power mode corresponding to the static pattern based on the first option information or adaptive charge sharing corresponding to the dynamic pattern based on the second option information, wherein the timing controller is configured to:

receive polarity information corresponding to a physical arrangement pattern of pixels of a display panel and corrects polarities of the previous line data and the current line data using the polarity information based on the physical arrangement pattern of pixels, determine whether to apply charge sharing to the current line data based on a result of a comparison between a power gain quantity and a power loss quantity, calculate the power gain quantity and the power loss quantity attributable to charge sharing for the current line data based on a result of a comparison between the previous line data and the current line data, and provide the second option information based on determining to apply charge sharing to the current line data;

wherein the source driver performs the adaptive charge sharing for selectively performing charge sharing on a source signal, corresponding to the current line data, based on the second option information.

12. A timing controller for a display device, comprising:

a pixel value storage configured to store previous line data and current line data and provide the previous line data and the current line data for mapping, wherein the timing controller is configured to:

receive panel information corresponding to a physical arrangement pattern of pixels of a display panel and receive polarity information corresponding to the panel information;

map the polarity information provided by the polarity information receiver to correspond to line data;

correct polarities of the previous line data and the current line data based on the polarity information;

receive the previous line data and the current line data from the pixel value correction device and calculate a power gain quantity and power loss quantity attributable to charge sharing for the current line data based on a result of a comparison between the previous line data and the current line data or calculate a first maximum change in an output of a source driver in which charge sharing is applied to the current line data and a second maximum change in the output of the source driver in which charge sharing is not applied to the current line data; and provide second option information on whether to apply the charge sharing to the current line data based on a result of a comparison between the power gain quantity and the power loss quantity, if a display pattern is a dynamic pattern and to provide, as first option information, one change selected from the first maximum change and the second maximum change depending on whether to apply the charge sharing to the previous line data, if the display pattern is a static pattern.

13. The timing controller of claim 12, wherein the timing controller is configured to:

configure a packet comprising display data and control data, and apply, to the control data, the first option information for a low power mode in which an amount of current to maintain the output of the source driver for the current line data is reduced or the second option information for adaptive charge sharing in which charge sharing for the current line data is selected.

14. The timing controller of claim 12, wherein the timing controller is configured to:

selectively perform a first operation of computing a data change between the previous line data and the current line data, a second operation of calculating a power gain quantity and power loss quantity attributable to the charge sharing for the current line data, a third operation of comparing the power gain quantity and the power loss quantity, and a fourth operation of detecting the first maximum change in the output of the source driver if the charge sharing is applied to the current line data and the second maximum change in the output of the source driver if the charge sharing is not applied to the current line data, sequentially perform the first operation, the second operation, and the third operation in accordance with the dynamic pattern, and sequentially perform the first operation and the fourth operation in accordance with the static pattern.

15. The timing controller of claim 12, wherein if the display pattern is the dynamic pattern, the timing controller provides the second option information for charge sharing-off for the current line data when the power gain quantity is equal to or smaller than the power loss quantity, and provides the second option information for charge sharing-on for the current line data when the power gain quantity is greater than the power loss quantity.

16. The timing controller of claim 12, wherein timing controller is configured to:

provide the first maximum change as the first option information if the charge sharing is applied to the previous line data, and provide the second maximum change as the second option information if the charge sharing is not applied to the previous line data.

17. The timing controller of claim 12, wherein the timing controller is configured to receive the polarity information corresponding to the panel information from an outer memory.

* * * * *